United States Patent [19]

Ballestrazzi et al.

[11] 3,991,909
[45] Nov. 16, 1976

[54] AUTOMATIC FEEDING DEVICE FOR DELIVERING ARTICLES FROM A MAGAZINE TO A CONVEYOR

[75] Inventors: Aris Ballestrazzi; Lamberto Tassi; Gianni Tosarelli, all of Vignola (Modena), Italy

[73] Assignee: Situno Holding S.A., Luxemburg

[22] Filed: July 30, 1975

[21] Appl. No.: 600,472

[30] Foreign Application Priority Data
July 31, 1974 Italy.................................. 25810/74

[52] U.S. Cl. ............................................. 221/214
[51] Int. Cl.² ........................................... B65H 3/22
[58] Field of Search ........... 221/213, 214, 215, 236; 214/8.5 R; 271/18.3, 131, 174, 180, 33, 132; 198/106

[56] References Cited
UNITED STATES PATENTS
3,051,355  8/1962  Honor ............................. 221/236 X
3,564,812  2/1971  Mueller et al. .................. 221/236 X
3,625,506  12/1971 Rovin................................. 271/18.3

Primary Examiner—Stanley H. Tollberg
Attorney, Agent, or Firm—Cushman, Darby & Cushman

[57] ABSTRACT

The invention relates to an automatic feeding device for delivering articles from a magazine to a conveyor, wherein the magazine is adapted to permit the articles to be delivered to be pulled out therefrom singly from below, and at least one grab-arm is provided adapted to pick up the article pulled out and to deposit it onto a tray which is being swept from said conveyor. To this end the said grab-arm is capable of performing a rotary-translatory motion between the magazine and the tray.

2 Claims, 5 Drawing Figures

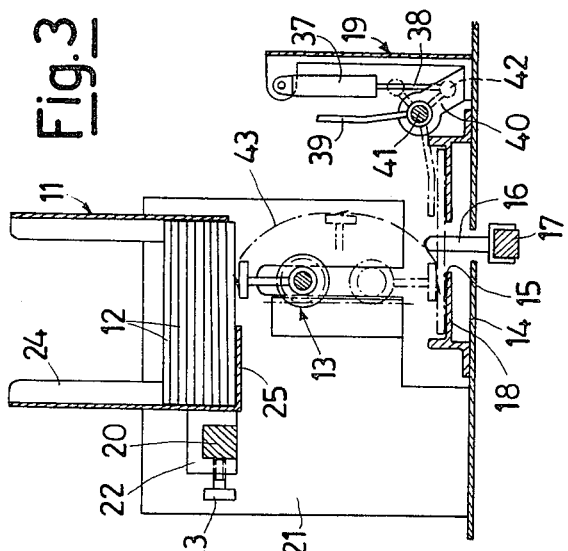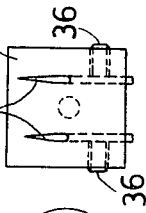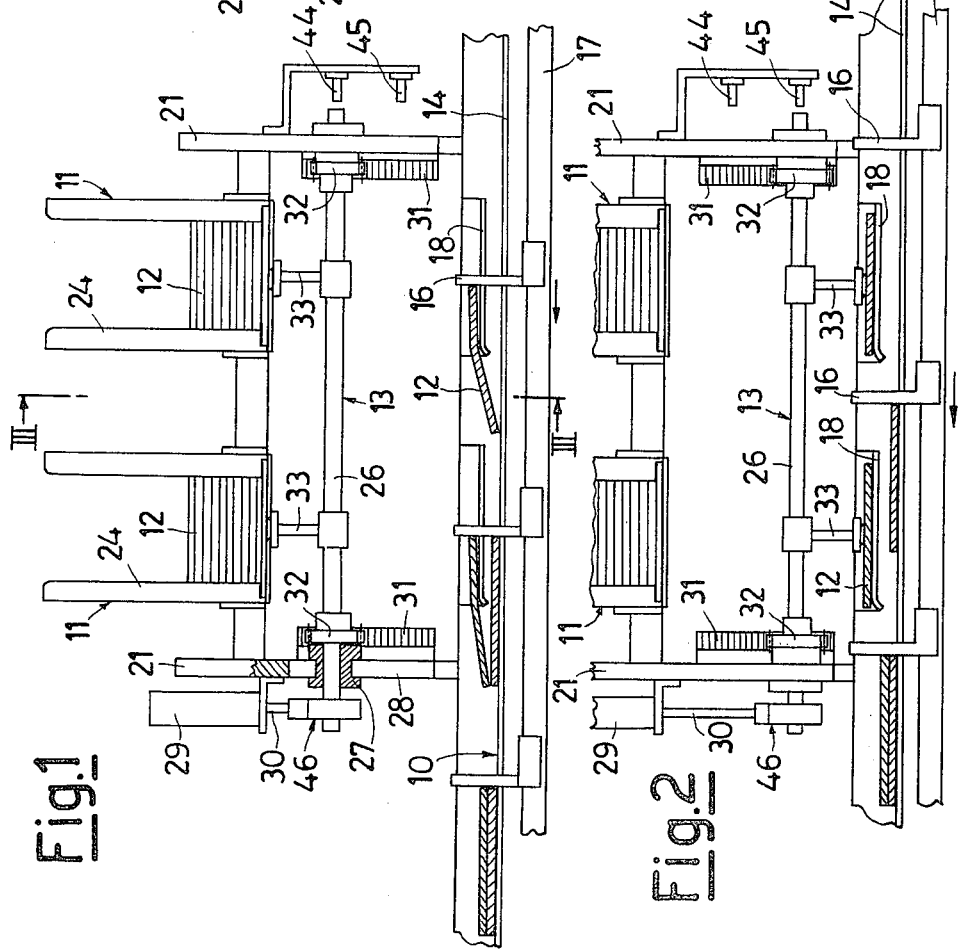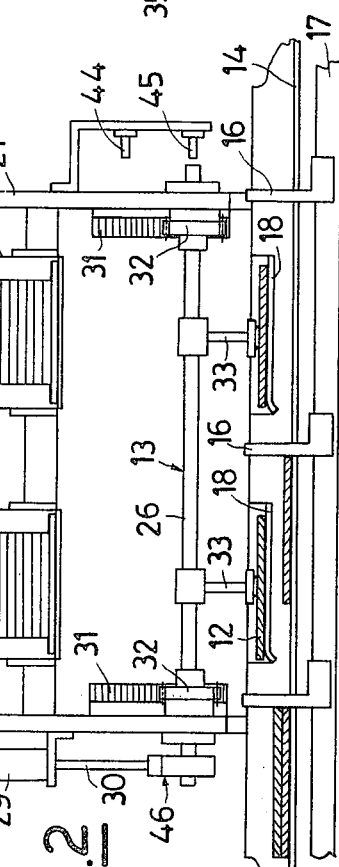

AUTOMATIC FEEDING DEVICE FOR DELIVERING ARTICLES FROM A MAGAZINE TO A CONVEYOR

The present invention relates generally to an automatic device capable of removing an article from a magazine and placing it correctly onto a conveyor which conveys it to a subsequent processing stage.

In particular, the invention relates to a device of the above mentioned kind for the automatic continuous delivery of batches of products to a packaging station.

For example, there are well known packages of products for household cleaning in which two or more product units, such as dusters, sponges, soap filled scouring pads and the like are packaged in packages of heat-shrinkable plastic.

Previously, the packaging device was fed by means of a conveyor onto which the single pieces were placed manually in a stock or side by side.

In such case, in order to attain adequate operating speeds it is necessary to employ several persons working along the length of the conveyor in continuous shifts and with a great expenditure of physical and psychic energy.

A purpose of the present invention is the total automation of the said operation, at the same time providing the packaging apparatus with a continuous feed at a high rate of delivery of products to be packaged.

To this end, according to the invention, provision is made for the realization of a device characterized in that it comprises, in combination: a continuous conveyor, at least one magazine suitable for containing the said articles in such a way that they can be pulled out singly from below, at least one grab-arm positioned between the said magazine and said conveyor and having a rotary-translatory movement between a raised position for the pulling down of an article from the said magazine and a lowered position for depositing the pulled-out object onto a relative stationary tray swept by said conveyor. Preferably, but not necessarily, provision is made for two magazines, two grab-arms and two trays.

For a better comprehension of the structural and functional characteristics of the invention, there is described hereinafter, by way of example only, one form of embodiment thereof, with reference to the accompanying drawings.

In the drawings:

FIG. 1 is a frontal elevational view of a device incorporating the invention.

FIG. 2 is a view similar to that of FIG. 1, but shown at another working stage.

FIG. 3 is a section taken along the line III—III of FIG. 1.

FIGS. 4 and 5 are a side and end view, respectively, of a grab-arm of the embodiment of FIG. 1.

The device shown in the drawings is structurally composed of a continuous conveyor 10, two magazines 11 positioned above the conveyor and suitable for containing a stack of products 12 to be packaged, a feeding device 13 capable of removing the products 12 from the magazines and depositing them correctly on the conveyor 10, and a pressor device 19.

The conveyor 10 comprises a slideway 14 with a central slit 15 through which protrude thrust teeth 16. The teeth 16 are carried, with equidistant spaces between them, by a chain 17, or other appropriate means of similar kind, moving continuously in closed ring fashion below the slideway 14. To simplify the drawings, illustration is given solely of the operating branch of the conveyor chain.

Above the slideway 14, provision is also made for two trays 18, which contain the product 12, these also being swept by teeth 16. The trays 18 are in perfect alignment with magazines 11.

The magazines 11 are supported bracketwise by means of a girder 20 which extends between the sides 21 of the frame of the machine. The magazines 11 are each mounted in a manner whereby their position along the girder is adjustable by means of a slide 22 placed astride the girder and lockable in position in stable manner by means of a locking system operable with the screw 23. The structure of the magazines 11 includes four angular uprights 24 and a partial base wall 25 which supports the stack of products 12 so as to allow them to be removed from below.

The feeding device 13 comprises a shaft 26 rotatable within terminal sliding blocks 27 which can translate within slits 28 of the sides 21. The translatory motion of the shaft 26 is caused by a pneumatic cylinder 29 which has the stem 30 of its piston appropriately articulated at 46 to the said shaft 26.

Lateral racks 31, engaged in respective pinions 32 keyed onto the shaft 26, positively guide the movements of the said shaft 26. Other guide systems are of course possible, such as for example chains winding on sprocket wheels. Onto the shaft 26 there are also keyed grab-arms 33 which at their free end carry a comb 34 with prongs 35 inclined in suitable manner in the direction of the lowering of the grab-arms (FIGS. 4 and 5). The position of the grab-arms 33 is such that, when raised, the prongs 35 engage with a slight pressure the lower most product 12 of the stack. The prongs 35 are housed in respective seatings and their extension from the support is adjustable by means of the dowels 36.

The pressor device 19 comprises a pneumatic cylinder 37 which has the stem 38 of its piston connected to a shaft 41 by means of a connecting rod shown schematically at 40. The shaft 41 is pivoted to the supports 42 and carries at least two pressure rods 39 correspondingly to the trays 18.

The functioning of the above described device is, briefly, as follows.

The grab-arms 33, moving from the position of FIG. 1 to that of FIG. 2 (illustrated also with dashed lines in FIG. 3), with their pointed prongs 35 take the lower most article 12 of the stack and remove it from the magazine, depositing it onto the correspondingly aligned tray 18. Simultaneously, the pressure rod 39 is lowered into the position shown with the dashed lines in FIG. 3 to ensure detachment of the product 12 from the prongs during the return of the grab-arms to the position of FIG. 1. The products 12 in this way deposited into the trays 18 are then taken up by the teeth 16 and carried away on the slideway 14. It should be noted that the disposition in successive interspaced groups of the components 11, 33 and 18 brings about the formation of a stack of two products 12 at every passage of a tooth 16 through the two trays 18. It is evident that a greater number of groups of the aforesaid components will form a stack of products of correspondingly greater number.

The aforesaid shifting of the grab-arms 33 is effected by controlling the emergence of the stem 30 from the cylinder 29 by means of the cinematic chain described previously and clearly shown in the drawings.

To the shaft 26 there is thus imparted a rotary-translatory motion and its arms 33 perform a trajectory 43 (FIG. 3) which is essentially cycloidal. This trajectory ensures that the product 12 is deposited on the correspondingly aligned tray 18 in a correct manner, without any stalling.

Sensor devices 44, 45, for example electromagnetic sensors, by means of a suitable control circuit (not shown), control the inversion of the motion of the actuator 29. The said control circuit can be of any appropriate type well known to a person skilled in the art, and is therefore not here described. The lowering of the pressure rod 39 can similarly be controlled by means of the same control circuit as for the actuator 29.

Clearly, the product 12 must be sufficiently substantial to allow its transfixing by the prongs 35.

One possible form of embodiment of the invention has been illustrated and described but variants and modifications can be made thereto without these causing it to fall outside the scope of the invention. For example, the magazines 11 and the feeding devices 13 can be positioned adjacently, to allow the packaging of packages of products placed side by side.

What we claim is:

1. An automatic device for the continuous delivery of stacked articles, comprising a continuous conveyor, at least one magazine suitable for containing said articles in a manner whereby they can be removed singly from underneath, at least one grab-arm positioned between said magazine and said conveyor and having a rotary-translatory movement between a raised position for the removal of an article from said magazine and a lowered position for the depositing of the removed article onto a correspondingly aligned tray movable by said conveyor, said grab-arm carrying at its free end a comb with inclined pointed prongs capable of transfixing said articles and pointing in the direction of the lowering of the grab-arm, said at least one grab-arm being mounted on a shaft which has a rotary-translatory movement and said shaft being mounted in rotating manner on sliding blocks translatable on guides in a frame of the machine, the rotary-translatory movement of said shaft being guided by rack-and-pinion gear assemblies.

2. A device according to claim 1, and further including pressor means acting on the article deposited on the tray.

* * * * *